Patented Oct. 19, 1926.

1,603,472

UNITED STATES PATENT OFFICE.

MAURICE KAHN, OF PARIS, FRANCE.

MANUFACTURE AND EXTRACTION OF NITROGENOUS PRODUCTS FROM PRODUCTS OF VEGETABLE ORIGIN.

No Drawing. Application filed July 5, 1924, Serial No. 724,539, and in France July 7, 1923.

A series of antiseptic substances that can be readily eliminated, particularly tetrachloride of carbon and generally the hereinafter recited substances, permit yeasts or barms and broadly all other products of vegetable origin containing proteolytic ferments to be treated by autolysis or by heterolysis or by a combination of autolysis and of heterolysis.

Such substances are:

1st. *Carbides.*—Benzene, toluenes (toluols) xylenes and liquid homologues thereof.

2nd. *Chloruretted halogenous derivatives.* —(*a*) Fatty series: Chloroform-tetrachloride of carbon-dichlorethylene-trichlorethylene-tetrachloracetylene - pentachlorethane - symmetrical and unsymmetrical dichlorethanes; chlorides of propyl, butyl and liquid homologues thereof; chlorides of propylene, butylene and liquid homologues thereof. (*b*) Aromatic series: Mono and poly chloro and bromobenzenes and homologues thereof; chlorides of benzyl and homologues thereof and their nitrated derivatives.

3rd. *Alcohols.*—Higher alcohols, butylic (standard and isobutylic) amylic, etc.

4th. *Sulphuretted derivatives.*—Sulphide of carbon, thiocarbonates, mercaptans, fatty sulphides, sulphuretted natural mineral oils (oils with ichthyol), isosulphocyanic ethers.

5th. *Aldehydes.*—Formaldehyde and its product of condensation with ammoniac, hexamethylenetetramine, acetaldehyde, chloral, acroleine, crotonic aldehyde, furfurol.

6th. Ketones of the fatty series or their mixture.

7th. *Phenols.*—Phenol-cresols and homologues thereof pure or mixed, their halogenous and nitrated, alcoholated, etc., derivatives.

8th. Fluorides, bromides soluble, alkaline and alkaline-terreous.

9th. Aniline and its homologues, quinoleine and its homologues. The raw mixture of the bases from tar distillation.

I can use the above mentioned bodies either singly or mixed with one another or again with inert bodies added.

If I take tetrachloride of carbon as the easily eliminated antiseptic substance I find that it renders proof against any microbian action a mass of matter that varies according to the vegetable product treated; in certain cases five to ten parts of tetrachloride of carbon per thousand of the vegetable product are sufficient for efficiency.

If I use compressed yeast such as obtained as a brewery by-product I add to it an equal weight of water, after which I add to the whole mass five to ten parts of tetrachloride of carbon per thousand of the yeast. I then stir up the mixture and put it in a drying room where a proper temperature for digestion is maintained; such temperatures, as will be understood, being a moderate one only, so as not to kill the proteolytic ferments contained in the yeast.

After a time that varies according to weather conditions, say about 15 days, I obtain a fairly liquid product which I filter. During the operating period I find an advantage in stirring up the mixture; I can decolour the product in various ways, especially by means of tannin or of animal charcoal (bone black).

I dry by means of industrial methods, for instance by a current of air which is sufficient to rid the product of whatever tetrachloride of carbon it may still contain, and I thus obtain a paste pleasantly palatable, rich in nitrogenous matters and suitable to make a highly valuable alimentary broth.

The products so obtained may be used singly or combined with the other elements of the alimentary ration or food allowance. They are perfectly soluble and by using one of the ordinary methods, I can obtain them in a pulverulent state.

The drying room to be used may be constituted by vats made of mere cement or of glass-lined cement or by large slate vats formed by firmly bolted slabs, but, whether made of cement or of slate, these vats must be contained in a chamber the walls of which are rendered non-conductive of heat by means of caked cork or of any other insulating material, the best temperature being maintained circa 40° C.

The digestion of vegetable products (some of them being rich in starch) may cause an escape of carbonic acid, so the vat must be provided with a device to permit the discharge of gases during digestion.

Unnecessary for yeast, crushing is imperatively required whenever other products the unit of which is of considerable size are dealt with.

I have therefore been led to crush the raw material: after it has been crushed I eventually add thereto a suitable quantity of water and to the whole the required quantity of tetrachloride of carbon.

For certain vegetable products an advantage may be found in adding proteolytic ferments.

Subsequent to these operations, I stir up and put the stuff in a drying room as in the instanced case of yeast.

As can be readily conceived a number of the products so treated will yield by-products not obtainable from yeast, for instance fatty bodies or usable mineral bodies.

In this case the products have only to be separated by any ordinary mechanical separation method (filtering, centrifuging, etc.) and in order to eliminate the antiseptic product, the products so separated will only have to be laid in fairly thin layers and exposed to the action either of an air-current or blast, or of heat.

And indeed numerous other means are readily available (steam blast, etc.) to eliminate the antiseptic product.

Having now particularly ascertained and described the nature of my said invention as well as the manner in which the same is to be performed, I declare that what I claim is:

1. A process for the manufacture of nitrogenous products, comprising the steps of mixing an easily-removable antiseptic substance with a product of vegetable origin containing a proteolytic ferment; subjecting the mixture to heat at a moderate temperature so as to prevent destruction of said ferment and for a period long enough to effect auto-digestion; and separating the liquid extract obtained thereby from the solid residue.

2. A process for the manufacture of nitrogenous products, comprising the steps of adding to a quantity of a product of vegetable origin containing a proteolytic ferment an equal quantity of water; mixing with the resultant product an easily-removable antiseptic substance; subjecting the mixture to heat at a moderate temperature so as to prevent destruction of said ferment and for a period long enough to effect auto-digestion; and separating the liquid extract obtained thereby from the solid residue.

3. A process according to claim 2, in which the antiseptic substance is added in the proportion of 5–10 parts thereof per 1000 parts of the vegetable product.

4. A process for the manufacture of nitrogenous products, comprising the steps of mixing carbon tetrachloride with a product of vegetable origin containing a proteolytic ferment; subjecting the mixture to heat at a moderate temperature so as to prevent destruction of said ferment and for a period long enough to effect auto-digestion; and separating the liquid extract obtained thereby from the solid residue.

5. A process for the manufacture of nitrogenous products, comprising the steps of mixing carbon tetrachloride with yeast; subjecting the mixture to heat at a moderate temperature so as to prevent destruction of the ferment contained in the yeast and for a period long enough to effect auto-digestion; and separating the liquid extract obtained thereby from the solid residue.

6. A process for the manufacture of nitrogenous products, comprising the steps of adding to a quantity of yeast an equal quantity of water; mixing with the resultant product an easily-removable antiseptic substance; subjecting the mixture to heat at a moderate temperature so as to prevent destruction of the ferment contained in the yeast and for a period long enough to effect auto-digestion; and separating the liquid extract obtained thereby from the solid residue.

7. A process for the manufacture of nitrogenous products, comprising the steps of adding to a quantity of a product of vegetable origin containing a proteolytic ferment an equal quantity of water; mixing carbon tetrachloride with the resultant product; subjecting the mixture to heat at a moderate temperature so as to prevent destruction of said ferment and for a period long enough to effect auto-digestion; and separating the liquid extract obtained thereby from the solid residue.

8. A process for the manufacture of nitrogenous products, comprising the steps of adding to a quantity of yeast an equal quantity of water; mixing carbon tetrachloride with the resultant product; subjecting the mixture to heat at a moderate temperature so as to prevent destruction of the ferment contained in the yeast and for a period long enough to effect auto-digestion; and separating the liquid extract obtained thereby from the solid residue.

9. A process according to claim 8, in which the carbon tetrachloride is added in the proportion of 8–10 parts thereof per 1000 parts of the yeast.

10. A process for the manufacture of nitrogenous products, comprising the steps of mixing an easily-removable antiseptic substance with a product of vegetable origin containing a proteolytic ferment; subjecting the mixture to heat at a moderate temperature so as to prevent destruction of said ferment and for a period long enough to effect auto-digestion; separating the liquid extract obtained thereby from the solid residue; and finally drying said liquid portion to powder form.

11. A process for the manufacture of nitrogenous products, comprising the steps of mixing an easily-removable antiseptic substance with yeast; subjecting the mixture to heat at a moderate temperature so as to prevent destruction of the ferment contained in the yeast and for a period long enough to effect auto-digestion; and separating the liquid extract obtained thereby from the solid residue.

12. A process for the manufacture of nitrogenous products, comprising the steps of mixing an easily-removable antiseptic substance with a product of vegetable origin and a proteolytic ferment; subjecting the mixture to heat at a moderate temperature so as to prevent destruction of said ferment and for a period long enough to effect auto-digestion; and separating the liquid extract obtained thereby from the solid residue.

In testimony whereof I affix my signature.

MAURICE KAHN.